UNITED STATES PATENT OFFICE.

OTTO SCHMIDT, OF LUDWIGSHAFEN-ON-THE-RHINE, THEODOR EICHLER, OF MANNHEIM, AND OTTO ALLEMANN, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

LIQUID COMPOSITION FOR LACQUERING PURPOSES.

1,166,790.      Specification of Letters Patent.      Patented Jan. 4, 1916.

No Drawing.      Application filed June 5, 1913. Serial No. 771,897.

*To all whom it may concern:*

Be it known that we, OTTO SCHMIDT, THEODOR EICHLER, and OTTO ALLEMANN, citizens, respectively, the first two of the German Empire and the third of the Swiss Republic, residing, respectively, the first and third at Ludwigshafen-on-the-Rhine and the other at Mannheim, Germany, have invented new and useful Improvements in Liquid Compositions for Lacquering Purposes, of which the following is a specification.

Our invention has reference to new compositions of matter which are liquid solutions capable of use for lacquering purposes and are characterized by containing a monocyclic ketone possessing either five or six carbon atoms in the ring. Cyclo-pentanone, cyclo-hexanone and homologues of these compounds may be mentioned as instances of cyclic ketones which can be employed according to this invention and they are very suitable for use as solvents for nitrocellulose and resins because they possess valuable solvent properties and also evaporate with such rapidity that the nitrocellulose, or the resin, is left as a firmly adhering transparent skin. The cyclic ketones are not so dangerous in use as, for instance, inflammable acetone and benzene, and the solutions are consequently excellently adapted for use in the lacquering industry for producing polishes, lacquers and the like. We have also found that solutions can be employed which contain other liquids, in particular hydrocarbons, such for instance as benzene, ligroin, and the like, in addition to one or more of the aforesaid cyclic ketones, and that such hydrocarbons can be present in considerable quantity without causing the lacquer to become dull through precipitation of nitrocellulose or resin, as the case may be. According to the different compounds which it may be desired to dissolve, the additional solvent and the quantity thereof may be advantageously varied. Such lacquers are characterized both by their cheapness and by the fact that they dry more quickly than those obtained with a cyclic ketone without such addition of solvent. The cyclic ketones further have the advantage that they dissolve many coloring matters, so that colored solutions can be obtained; the aforesaid cyclic ketones can also be used for removing nitrocellulose or resins by dissolving them away from any object as desired. The lacquers containing one or more cyclic ketones, as hereinbefore set forth, may also contain other ingredients, such as are or may be used in the manufacture of lacquers.

The following examples will serve to illustrate further the nature of this invention and how it can be carried into practical effect, but the invention is not confined to these examples. The parts are by weight.

Example 1: Dissolve 2 parts of nitrocellulose in 100 parts of cyclo-hexanone. A lacquer is obtained which is suitable for application to wood, polished metal, and the like.

Example 2: Dissolve 1 part of nitrocellulose in 50 parts of cyclo-hexanone and add 50 parts of ligroin. The solution obtained is suitable for lacquering by dipping the article into the solution.

Example 3: Dissolve 5 parts of nitrocellulose in 100 parts of cyclo-hexanone. This solution is suitable for fastening pieces of celluloid together.

Example 4: Dissolve 20 parts of dammar in 60 parts of cyclo-hexanone, whereupon a solution is obtained which can be used for lacquering. If desired, linseed oil can be added to the lacquer to reduce the brittleness of the skin obtained.

Instead of dammar, copal, or pine resin, can be employed, or other suitable resins can be made use of.

In a similar manner, solutions for other purposes of the lacquer industry, or for analogous purposes, can be obtained and, in a similar manner, homologues of cyclo-hexanone, or a mixture of cyclo-hexanone and one or more than one homologue thereof can be employed. If desired, other solvents, or diluents, can be employed at the same time as the cyclic ketones and, if desired, other suitable additions may be made.

Now what we claim is:—

1. As a new composition of matter which is suitable for lacquering purposes, a liquid solution containing a monocyclic ketone possessing more than four and less than seven carbon atoms in the ring.

2. As a new composition of matter which is suitable for lacquering purposes, a liquid solution containing nitrocellulose and a monocyclic ketone possessing more than four and less than seven carbon atoms in the ring.

3. As a new composition of matter which is suitable for lacquering purposes, a liquid solution containing nitrocellulose, a hydrocarbon and a monocyclic ketone possessing more than four and less than seven carbon atoms in the ring.

4. As a new composition of matter which is suitable for lacquering purposes, a liquid solution containing nitrocellulose and methyl cyclohexanone.

5. As a new composition of matter which is suitable for lacquering purposes, a liquid solution containing nitrocellulose, methyl cyclohexanone and benzene.

In testimony whereof we have hereunto set our hands in the presence of two subscribing witnesses.

OTTO SCHMIDT.
THEODOR EICHLER.
OTTO ALLEMANN.

Witnesses:
J. ALEC. LLOYD,
JOSEPH PFEIFFER.